(No Model.)

T. B. JEFFERY.
PNEUMATIC TIRE.

No. 523,282. Patented July 17, 1894.

Witnesses.
E. T. Wray.
Jean Elliott

Inventor.
Thos. B. Jeffery
by Burton and Burton
his Attys

UNITED STATES PATENT OFFICE.

THOMAS B. JEFFERY, OF CHICAGO, ILLINOIS.

PNEUMATIC TIRE.

SPECIFICATION forming part of Letters Patent No. 523,282, dated July 17, 1894.

Application filed March 10, 1894. Serial No. 503,160. (No model.)

*To all whom it may concern:*

Be it known that I, THOMAS B. JEFFERY, a citizen of the United States, residing at Chicago, county of Cook, and State of Illinois, have invented certain new and useful Improvements in Pneumatic Tires, which are fully set forth in the following specification, reference being had to the accompanying drawings, forming a part thereof.

The purpose of this invention is to provide a pneumatic tire adapted to be applied to the rim in such a way that inflation of the core causes the tire to grip the rim by inward pressure thereagainst instead of by pressure outward against flanges with which the rim may be provided. This latter method is found undesirable upon wood tires because of the tendency to split the wood, and the method of gripping by pressure from the outside inward instead of from within outward, presents the advantage of applicability to ordinary wheels not primarily designed for pneumatic tires, for a tire adapted to grasp the rim in this way can be applied to an ordinary carriage wheel, if made of proper dimensions.

Figure 1:
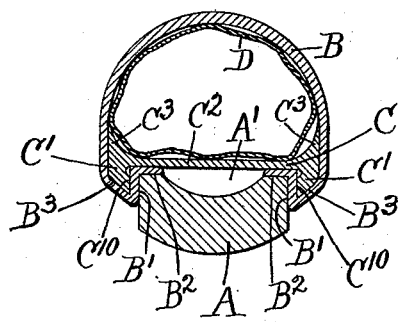
Figure 2:
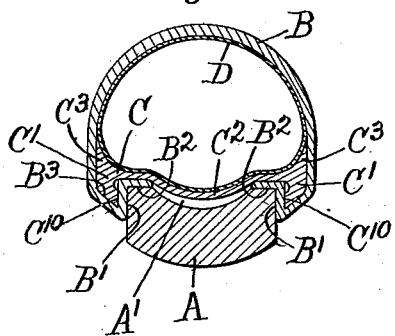
Figure 3:
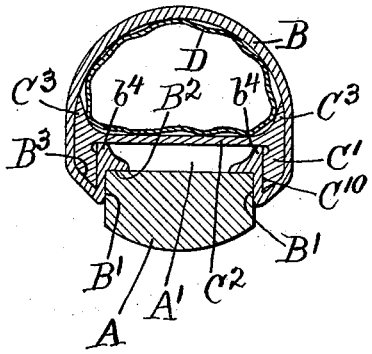
Figure 4:
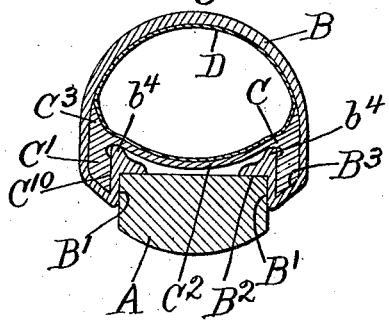

In the drawings,—Figure 1 is a transverse section of a wheel rim and tire embodying my invention, showing the core uninflated. Fig. 2 shows the same with the core inflated. Fig. 3 is a similar view representing a slightly modified form of sheath, the core being uninflated. Fig. 4 shows the core represented in Fig. 3, with the core inflated.

A is the wheel rim.

B is the tire sheath or cover.

D is the inflatable core.

C is a clamp or shoe which is interposed between the inflatable core D, and the sheath or cover on the side toward the rim, as distinguished from the side toward the tread.

The sheath or cover B is shaped so that at the margins it presents two inwardly facing clamping surfaces $B'$ $B'$, which extend respectively downward from two downwardly facing stop shoulders $B^2$ $B^2$, the stop shoulders being adapted to lodge on the periphery of the rim, and the clamping surfaces to bind against the opposite sides of the rim. The sheath is recessed at $B^3$, back of the clamping surfaces $B'$ $B'$, the effect being as if, being flexible, the sheath were hung on the corner of the rim and drooped therefrom outwardly at each side, leaving the recesses $B^3$ in the loop or droop; and, in practice, such is substantially the form and appearance.

The shoe C may be in a single continuous piece, or even in an endless ring or band encircling the entire wheel, or it may be in several sections. In the latter case, each section will be from thirty to one hundred and eighty degrees in extent. It comprises two side wings $C'$ $C'$, and the connecting web $C^2$. The side wings $C'$ are adapted to occupy the spaces $B^3$ in the cover, and they present inwardly facing shoulders $C^{10}$, which bear against the inner surface of the cover back of the clamping surfaces $B'$; and when the inflation of the core, as hereinafter described, tends to draw the two wings together, they bind the clamping surfaces $B'$ against the sides of the rim. Extending outwardly,—that is, away from the center of the wheel,—from the plane of the web $C^2$, the shoe has the flanges $C^3$ $C^3$, which, in conjunction with the wings $C'$ $C'$, will give to its cross-section the general form of the letter H. The shoe having been placed within the cover with the wings $C'$ suitably lodged in the spaces $B^3$, and the inflatable core being in position outside of the shoe and inside of the cover, its inflation causes it to press against the flanges $C^3$ $C^3$, and thereby cause the wings $C'$ $C'$ to press the surfaces $B'$ $B'$ of the cover against the sides of the rim. The further inflation of the core tends to depress the web $C^2$, which, when the shoe is first applied, extends across the recess $A'$, which may be formed in the periphery of the rim, or across a recess produced by projecting flanges $b^4$ $b^4$, in the form of cover shown in Figs. 3 and 4, and such depression of the web $C^2$ tends to draw the wings or flanges $C'$ $C'$ together and cause them to bind the cover more firmly upon the rim.

The clamp or shoe is preferably constructed of firm textile fabric as a foundation upon which rubber gum is molded to the desired form. The details of formation of the shoe to provide the requisite strength at the points where tenacity is required and rigidity where rigidity is required, and flexibility in the web $C^2$, belong to the art of the rubber manufacturer, and these details I therefore do not attempt to specify here. But it will be understood that the wings at the sides of the web $C^2$, which give it the general H-form are sufficiently firm, so that a section which has an extent of from sixty to ninety degrees or more about the circumference of the wheel, will be quite stiff by reason of the curvature, so that the tension of the web $C^2$ under the pressure of the inflated core will pull the two wings together with an almost direct lateral pressure upon the rim, and that whatever tendency there might be to rock the wings over the point of lodgment of the shoe at the margin of the depression into which the web $C^2$ is stretched, will be overcome by the expansive pressure of the core operating against the flanges $C^3 C^3$, tending to force those flanges outward and so to rock the lower ends of the wings inward to press the tire cover against the rim as described.

I claim—

1. In combination with the rim, the tire cover lodged upon the lateral margins of the rim and drooping from such lodgment to form recesses at opposite sides of the rim; a shoe having wings adapted to enter said recesses, and a web which connects the wings extending across the face of the rim; and the inflatable core located within the sheath and outside of the shoe: substantially as set forth.

2. In combination with the rim, the tire cover provided at each side with a shoulder adapted to lodge upon the periphery of the rim, and a clamping face adapted to bear against the side of the rim, and drooping outside of each side of the rim; a clamp or shoe adapted to enter the recesses formed by the drooping of the sheath, and flanges which project in the opposite direction from such wings respectively; and the inflatable core located within the tire cover and outside of the clamp or shoe adapted when inflated to press against the flanges: substantially as set forth.

3. In combination with the rim, the tire cover having its edges infolded and provided respectively with shoulders by which it hangs on the rim and with ribs projecting outward from the periphery of the rim at the corners of the latter to bound a recess between them; the clamping shoe having wings which occupy the cavities in the droop of the cover, and a web which extends across the recess between said ribs and the inflatable core located within the cover and outside the shoe adapted by expansion to press upon the web of the shoe to sink it into the depression between the ribs of the cover: substantially as and for the purpose set forth.

THOS. B. JEFFERY.

Witnesses:
CHAS. S. BURTON,
JEAN ELLIOTT.